(12) United States Patent
Kim et al.

(10) Patent No.: US 7,366,855 B2
(45) Date of Patent: Apr. 29, 2008

(54) PAGE REPLACEMENT METHOD USING PAGE INFORMATION

(75) Inventors: Jin-kyu Kim, Seoul (KR); Kwang-yoon Lee, Seongnam-si (KR); Jin-soo Kim, Daejeon (KR); Sun-young Park, Daejeon (KR); Chan-ik Park, Seoul (KR); Jeong-uk Kang, Daejeon (KR)

(73) Assignee: Samsung Electronics Co., Ltd., Suwon (KR)

( * ) Notice: Subject to any disclaimer, the term of this patent is extended or adjusted under 35 U.S.C. 154(b) by 272 days.

(21) Appl. No.: 11/191,074

(22) Filed: Jul. 28, 2005

(65) Prior Publication Data

US 2006/0026372 A1  Feb. 2, 2006

(30) Foreign Application Priority Data

Jul. 28, 2004  (KR) ...................... 10-2004-0059384

(51) Int. Cl.
*G06F 12/00* (2006.01)
(52) U.S. Cl. ..................................... 711/160
(58) Field of Classification Search ................ 711/136, 711/160, 103
See application file for complete search history.

(56) References Cited

U.S. PATENT DOCUMENTS

| 5,734,861 | A | * | 3/1998 | Cohn et al. ................. 711/134 |
| 6,389,513 | B1 | * | 5/2002 | Closson ...................... 711/129 |
| 6,968,351 | B2 | * | 11/2005 | Butterworth ................ 707/206 |
| 2001/0001873 | A1 | | 5/2001 | Wickeraad et al. |
| 2002/0152361 | A1 | | 10/2002 | Dean et al. |

FOREIGN PATENT DOCUMENTS

JP  4-257953 A  9/1992

* cited by examiner

*Primary Examiner*—Hiep T. Nguyen
(74) *Attorney, Agent, or Firm*—Sughrue Mion, PLLC (57) ABSTRACT

A page replacement method is provided. The page replacement method includes (a) establishing a first page list in which a plurality of pages in a main memory are listed in an order that they have been used, (b) establishing a second page list in which some of the pages in the main memory whose images are stored in a storage medium are listed in an order that they have been used, and (c) storing data downloaded from the storage medium in the pages included in the second page list in an order opposite to the order that the corresponding pages are listed in the second page list.

22 Claims, 5 Drawing Sheets

PAGE INFORMATION(700)

Image on storage device = 'C'
The number of Memory-outs = m
The number of Clean-outs = n
Page data

FIG. 8

PAGE REPLACEMENT METHOD USING PAGE INFORMATION

CROSS-REFERENCE TO RELATED APPLICATION

This application claims priority from Korean Patent Application No. 10-2004-0059384 filed on Jul. 28, 2004 in the Korean Intellectual Property Office, the disclosure of which is incorporated herein by reference in its entirety.

BACKGROUND OF THE INVENTION

1. Field of the Invention

The present invention relates to a page replacement method performed in a system that uses a flash memory as a storage medium, and more particularly, to a page replacement method that can minimize the number of write operations performed on a flash memory and can enhance a memory hit rate.

2. Description of the Related Art

Figure 1:
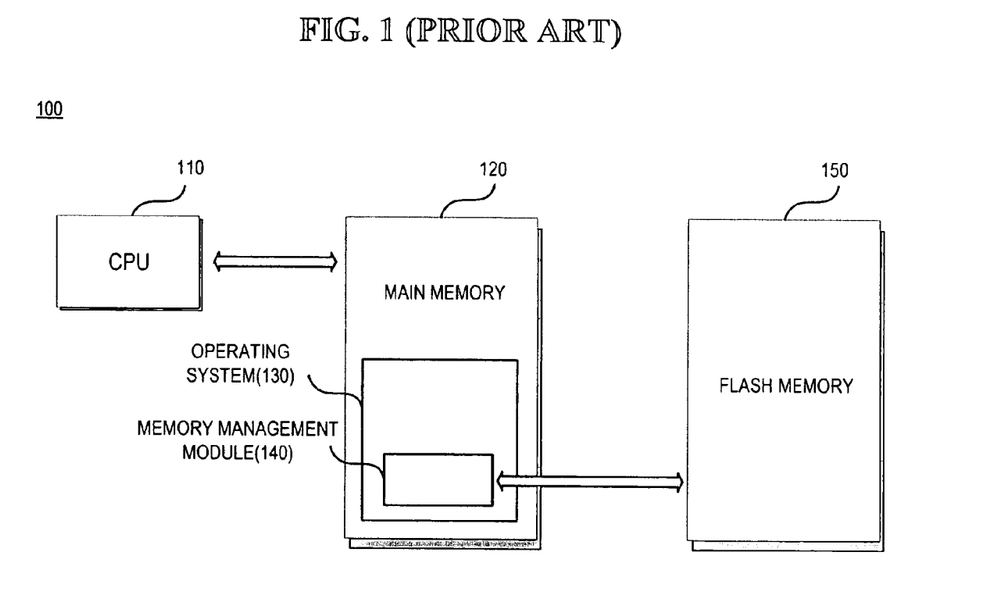
FIG. 1 is a schematic block diagram illustrating a conventional system that uses a flash memory as a storage medium.

FIG. 1 is a schematic block diagram illustrating a conventional system 100 that uses a flash memory 150 as a storage medium.

Referring to FIG. 1, the system 100 includes a CPU 110, a main memory 120, and the flash memory 150. An operating system 130 is loaded in a portion of the main memory 120. The storage capacity of the main memory 120 is managed by a memory management module 140 included in the operating system 130. In other words, the memory management module 140 manages used pages and free pages of the main memory 120. Here, a page is a unit in which data is written to a memory at one time.

The memory management module 140 allocates a page of the main memory 120 yet to be used for predetermined data stored in the flash memory 150 and reads the predetermined data from the flash memory 150 in order to transfer the predetermined data from the flash memory 150 to the main memory 120.

However, if there are no free pages in the main memory 120, one of the pages of the main memory 120 that have already been used is selected, and the predetermined data read from the flash memory 150 is written to the selected page of the main memory 120. An algorithm that reuses used pages of a memory as new pages is called a page replacement algorithm. Meanwhile, if the selected page of the main memory 120 has already been modified, data stored in the selected page of the main memory 120 is written to the flash memory 150, and the new data is extracted from the flash memory 150. This means that write operations are performed on the flash memory 150.

However, if the selected page of the main memory 120 has not been modified, the flash memory 150 still has an image of the selected page of the main memory 120. Thus, a write operation does not need to be carried out on the flash memory 150, and the selected page of the main memory 120 is removed. Here, the image of the selected page of the main memory 120 is a relative concept. In a case where data stored in an arbitrary page of the main memory 120 is also stored in the flash memory 150, the flash memory 150 is considered having an image of the arbitrary page of the main memory 120. Likewise, in a case where data stored in an arbitrary page of the flash memory 150 is also stored in the main memory 120, the main memory 120 is considered to have an image of the arbitrary page of the flash memory 150.

There are a variety of conventional page replacement algorithms.

Examples of the conventional page replacement algorithms include a first in first out (FIFO) algorithm that replaces a page that has been used first, a least recently used (LRU) algorithm that replaces a page that has been least recently used, a least frequently used (LFU) algorithm that replaces a page that has been least frequently used, and a not recently used (NRU) algorithm that replaces a page that has not been used recently.

Figure 2:
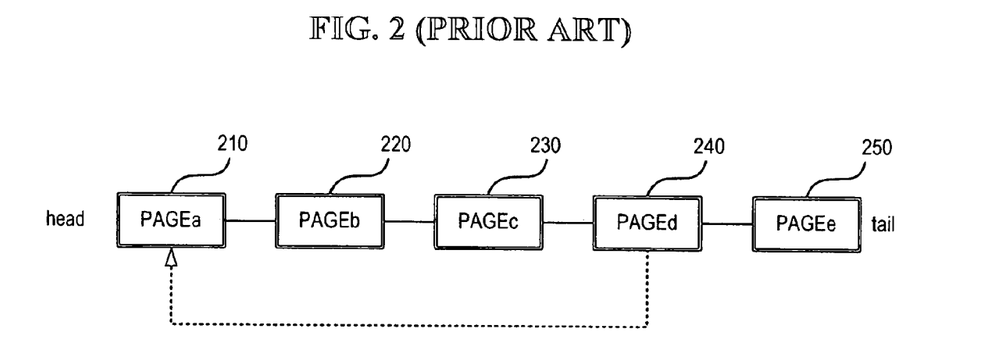
FIG. 2 is a diagram illustrating a least recently used (LRU) algorithm.

FIG. 2 is a diagram illustrating an LRU algorithm that selects a page of the main memory 120 of FIG. 1 that has not been read or written to recently as a page to be replaced. The LRU algorithm is also applicable to a cache memory.

The LRU algorithm is based on the principle of temporal locality, which means that a page that has not been accessed for a long time is not likely to be accessed in the near future.

In the LRU algorithm, a list of a plurality of pages of the main memory 120 is managed so that one of the pages of the main memory 120 that has been most recently accessed tops the corresponding page list.

Referring to FIG. 2, PAGEa (210) is located at the head of a page list because it has been most recently accessed. When Paged (240) is accessed, it is transferred to the head of the page list so that it is followed by page a (210). A page at the tail of the page list, i.e., Pagee (250), is used as a page to be replaced.

Figure 3:
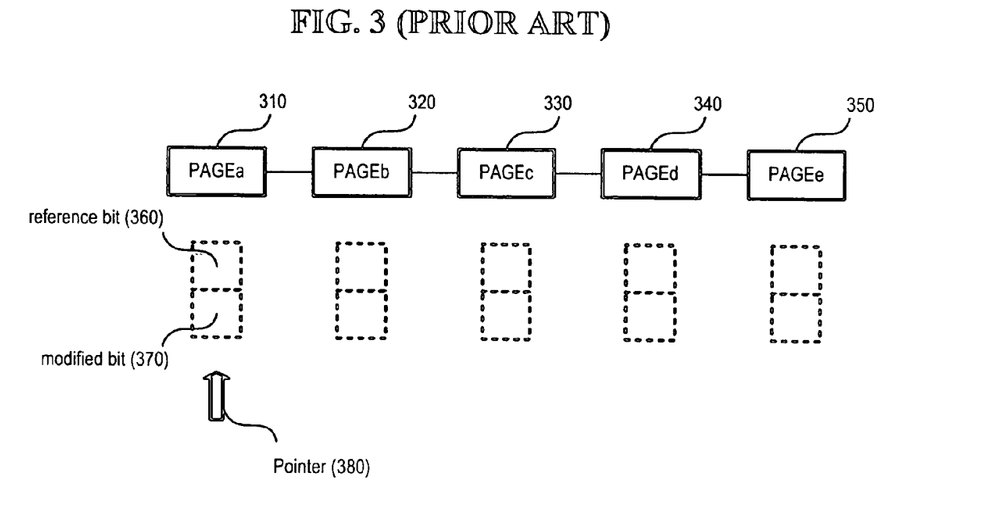
FIG. 3 is a diagram illustrating a not recently used (NRU) algorithm.

FIG. 3 is a diagram illustrating an NRU algorithm.

Referring to FIG. 3, the locations of a plurality of pages, i.e., pages a through e (310 through 350), in a page list, are fixed, and each of pages a through e (310 through 350) has page information represented by 2 bits, i.e., a reference bit 360 and a modified bit 370.

The reference bit 360 is initially set to a value of '0' and is switched to a value of '1' when a corresponding page is used. The modified bit 370 is initially set to a value of '0' and is switched to a value of '1' when the corresponding page is modified. The reference bit 360 is periodically reset to a value of 0 because the corresponding page becomes less likely to be referenced over time.

A pointer 380 points to a page to be replaced. The pointer 380 examines the reference bit 360 and the modified bit 370 of each of pages PAGEa (310), PAGEb (320), PAGEc (330), PAGEd (340), and PAGEe (350) while sequentially moving from PAGEa (310) to PAGEb (320), from PAGEb (320) to PAGEc (330), from PAGEc (330) to PAGEd (340), and from PAGEd (340) to PAGEe (350), and then selects one of PAGEa through PAGEe (310 through 350) as the page to be replaced based on the examination results. When the pointer 380 arrives at the tail of the page list, it moves back to the head of the page list and then performs the above-described operation again.

Here, the pointer 380 selects one of pages a through e (310 through 350) as the page to be replaced according to a set of rules. Specifically, the pointer 380 selects a page, if any, whose reference bit 360 and modified bit 370 are all set to a value of '0' as the page to be replaced. If none of the pages in the page list have the reference bit 360 and the modified bit 370 all set to a value of '0', the pointer 380 selects a page, if any, whose reference bit 360 is set to a value of '1' and whose modified bit 370 is set to a value of '0' as the page to be replaced. If none of the pages in the page list have the reference bit 360 set to a value of '1' and has the modified bit 370 set to a value of '0', the pointer 380 selects a page in the page list whose reference bit 360 and modified bit 370 are all set to a value of '1' as the page to be replaced.

If one of PAGEa through PAGEe (310 through 350) selected as the page to be replaced has already been modified, a write operation is performed on the flash memory

150. However, a delay time required for performing a write operation on the flash memory 150 is generally greater than a delay time required for performing a read operation on the flash memory 150. Thus, the higher the number of write operations performed on the flash memory 150, the greater the delay time.

It is possible to reduce delay time regarding the operation of the flash memory 150 by reducing the number of write operations performed on the flash memory. The LRU algorithm selects a page of the main memory 120 located at the tail of a page list as a page to be replaced regardless of whether the page has been modified. Therefore, when the LRU algorithm is applied to the conventional system 100 of FIG. 1, the performance of the conventional system 100 of FIG. 1 may deteriorate because of frequent write operations performed on the flash memory 150.

In addition, the NRU algorithm does not consider memory hit rate regarding non-modified pages of the main memory 120. Here, the memory hit rate indicates the number of times that the CPU 110 shown in FIG. 1 has successfully obtained meaningful data from the main memory 120 by accessing the main memory 120. In other words, pages of the main memory 120 whose reference bits 360 have the same value and whose modified bits 370 have a value of '0' have the same priority level in terms of page replacement regardless of the memory hit rate.

Therefore, there is a need for development of a page replacement algorithm that minimizes the number of write operations performed on a flash memory while ensuring a memory hit rate.

SUMMARY OF THE INVENTION

The present invention provides a page replacement algorithm which can reduce delay time regarding the inputting/outputting of data to/from a flash memory and can enhance memory hit rate by minimizing the number of write operations performed on the flash memory.

The above stated object as well as other objects of the present invention will become clear to those skilled in the art upon review of the following description.

According to an aspect of the present invention, there is provided a page replacement method including (a) making a first page list in which a plurality of pages in a main memory are listed in an order that they have been used, (b) making a second page list in which some of the pages in the main memory whose images are stored in a storage medium are listed in an order that they have been used, and (c) storing data downloaded from the storage medium in the pages included in the second page list in an order opposite to the order that the corresponding pages are listed in the second page list.

According to another aspect of the present invention, there is provided a page replacement method including (a) making a first page list in which a plurality of pages in a main memory are listed in an order that they have been used, (b) making a second page list in which some of the pages in the main memory whose images are stored in a storage medium are listed in an order that they have been used, (c) making a third page list in which some of the pages in the main memory whose images are not stored in the storage medium are listed in an order that they have been used, and (d) storing data downloaded from the storage medium in the pages included in the second page list in an order opposite to the order that the corresponding pages are listed in the second page list, if the second page list is not empty, and storing data downloaded from the storage medium in the pages included in the third page list in an order opposite to the order that the corresponding pages are listed in the third page list, if the second page list is empty.

According to still another aspect of the present invention, there is provided a page replacement method including (a) making a first page list in which a plurality of pages in a main memory are listed in an order that they have been used, (b) making a second page list in which some of the pages in the main memory whose images are not stored in a storage medium are listed in an order that they have been used, and (c) storing data downloaded from the storage medium in the pages included in the second page list in an order opposite to the order that the corresponding pages are listed in the second page list.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

Aspects of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of a page replacement method according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

For a better understanding of the present invention, the terms used in this disclosure will now be described in detail.

Clean Page

A clean page is a page of a main memory whose image exists in a flash memory and is represented by 'C' in the drawings.

Dirty Page

A dirty page is a page of the main memory whose image does not exist in the flash memory and is represented by 'D' in the drawings.

Page Cache

A page cache is a memory zone managed by a memory management module in an operating system.

Clean First Least Recently Used (CFLRU) List

A CFLRU list is a clean page list in which a clean page that has been the most recently used is listed first and a clean page that has been least recently used is listed last.

CFLRU-Dirty Related (CFLRU-D) List

A CFLRU-D list is a dirty page list in which a dirty page that has been the most recently used is listed first and a dirty page that has been least recently used is listed last.

For the convenience of explanation, it is assumed that a page replacement method according to an exemplary embodiment of the present invention will now be described with reference to the structure of the conventional system 100 of FIG. 1 and will now be assumed to be performed by the memory management module 140 included in the conventional system 100 of FIG. 1.

Figure 4:
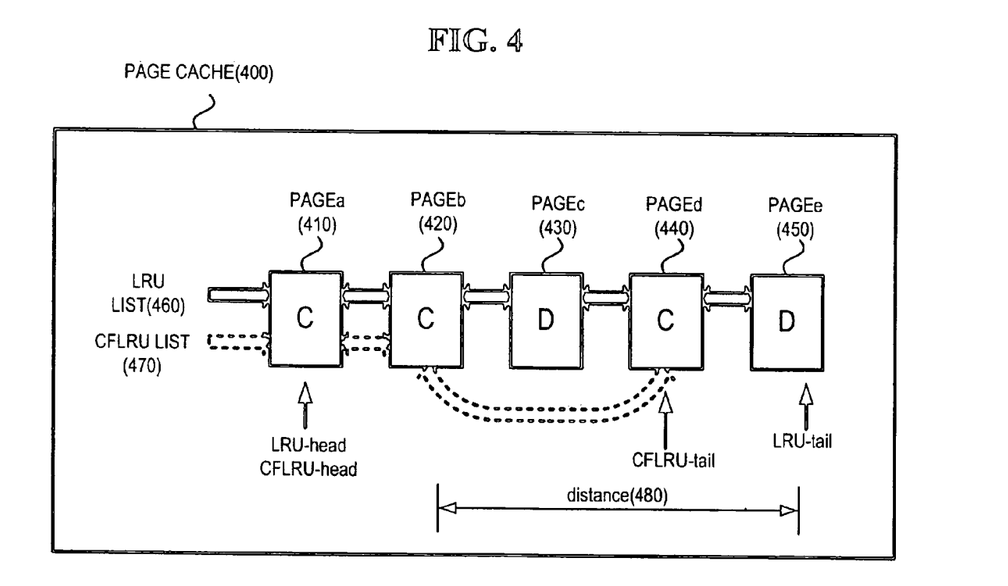
FIG. 4 is a diagram illustrating the structure of a clean first LRU (CFLRU) algorithm according to an exemplary embodiment of the present invention.

FIG. 4 is a diagram illustrating a CFLRU algorithm according to an exemplary embodiment of the present invention.

Referring to FIGS. 1 and 4, the memory management module 140, which is part of the operating system 130, stores predetermined data in a portion of the main memory 120 and thus enables the predetermined data to be quickly accessed by the operating system 130 or a processor. The portion of the main memory 120 managed by the memory management module 140 is referred to as a page cache 400, as described above. The page cache 400 is comprised of a plurality of pages having the same size.

If no free space is left in the page cache 400, the memory management module 140 can make a free space in the page cache 400 by transferring data stored in a portion of the page cache 400 to a slow storage device, such as a disc. For this, a memory replacement algorithm may be used to select one of the pages of the page cache 400 and to store data stored in the selected page to the slow storage device.

The CFLRU algorithm suggested in the present embodiment is applicable to a NAND flash memory. In addition, a modified version of a typical LRU algorithm is also applicable to a NAND flash memory.

The page cache 400 is comprised of a plurality of pages, i.e., PAGEa (410) through PAGEe (450). Referring to FIG. 4, pages represented by 'C' are clean pages, and pages represented by 'D' are dirty pages.

Pages PAGEa through PAGEe (410 through 450) are managed using an LRU list 460 and a CFLRU list 470. The LRU list 460 lists all of the pages of the page cache 400, i.e., pages PAGEa through PAGEe (410 through 450), and the CFLRU list 470 lists only clean pages of the page cache 400, i.e., pages PAGEa, PAGEb, and PAGEd (410, 420, and 440).

A page that has been most recently used is located at the head of the LRU list 460, and a page that has been least recently used is located at the tail of the LRU list 460, as described above, regardless of whether the pages are clean pages or dirty pages. A clean page that has been most recently used is located at the head of the CFLRU list 470, and a clean page that has been least recently used in located at the tail of the CFLRU list 470.

If a clean page is selected as a page to be replaced through a memory replacement algorithm, data stored in the clean page does not need to be written to the flash memory 150 because an image of the clean page exists in the flash memory 150. However, if a dirty page is selected as the page to be replaced through the memory replacement algorithm, data stored in the dirty page needs to be written to the flash memory 150 because an image of the dirty page does not exist in the flash memory 150.

Figure 5:
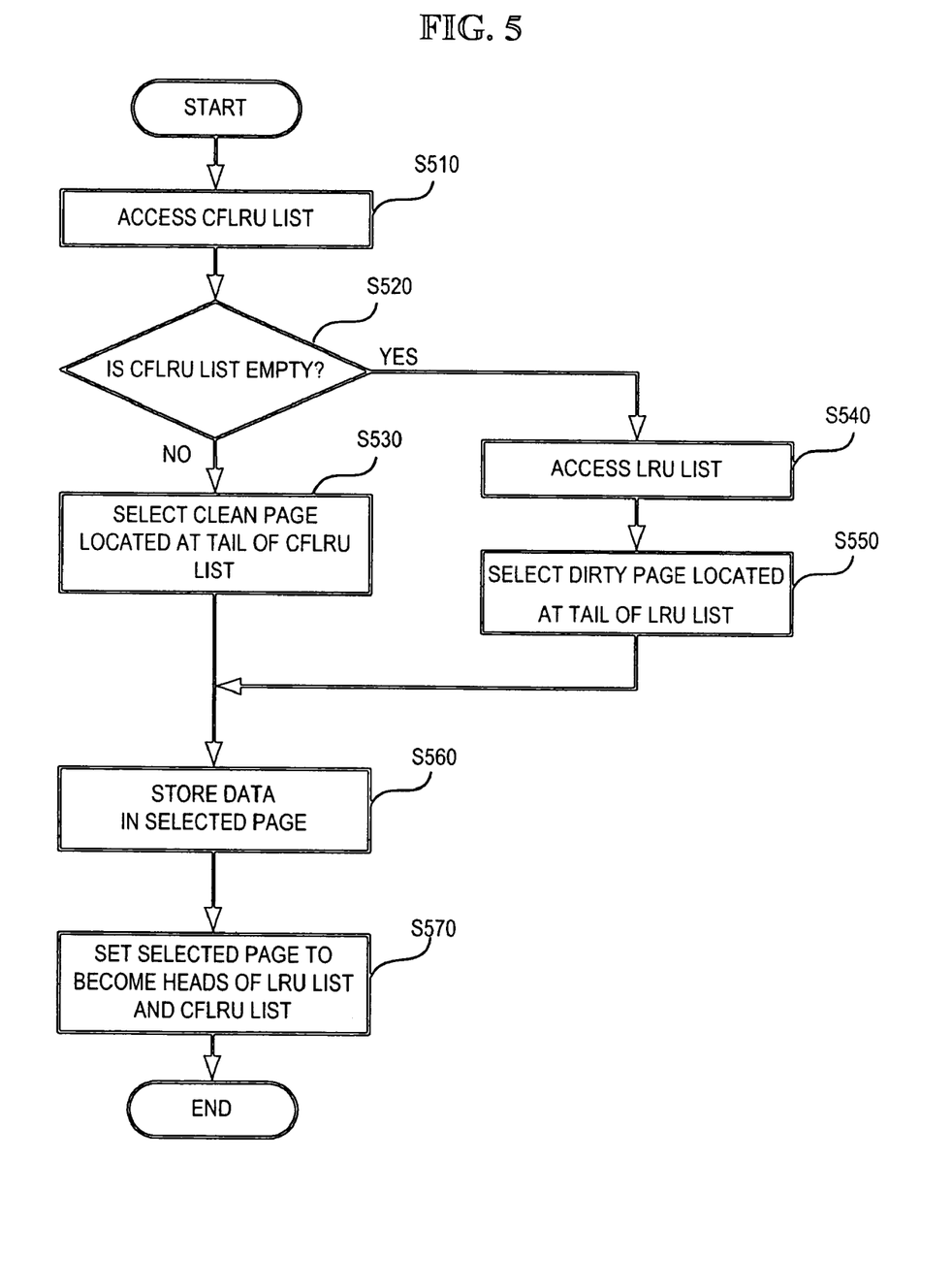
FIG. 5 is a flowchart illustrating a page replacement method using a CFLRU algorithm according to an exemplary embodiment of the present invention.

FIG. 5 is a flowchart illustrating a page replacement method using a CFLRU algorithm according to an exemplary embodiment of the present invention.

Referring to FIGS. 1, 4, and 5, in operation S510, the CFLRU list 470 is accessed in order to determine which of the pages of the main memory 120 is to be replaced. The CFLRU list 470 includes only clean pages, i.e., PAGEa (410), PAGEb (420), and PAGEd (440).

In operation S530, if the CFLRU list 470 is not empty, a page located at the tail of the CFLRU list 470, i.e., PAGEd (440), is selected as a page to be replaced. In operation S560, data downloaded from the flash memory 150 is stored in PAGEd (440). Since an image of PAGEd (440) is stored in the flash memory 150, data written on PAGEd (440) does not need to be written to the flash memory 150. In operation S570, a pointer pointing to the heads of the LRU list 460 and the CFLRU list 470 points to PAGEd (440) because PAGEd (440) has been most recently used and is a clean page. If the data written on PAGEd (440) is modified afterwards, PAGEd (440) is removed from the CFLRU list 470.

If the CFLRU list 470 is empty, it appears that the main memory 120 has no clean pages. Thus, in operation S540, the memory management module 140 accesses the LRU list 460. In operation S550, the memory management module 140 selects a dirty page located at the tail of the LRU list 460, i.e., PAGEe (450). In operation S560, the memory management module 140 stores the data downloaded from the flash memory 150 in PAGEe (450). Since an image of PAGEe (450) is not stored in the flash memory 150, data stored in PAGEe (450) needs to be written to the flash memory 150. In operation S570, the pointer pointing to the heads of the LRU list 460 and the CFLRU list 470 points to PAGEe (450). If the data stored in PAGEe (450) is modified afterwards, PAGEe (450) is removed from the CFLRU list 470.

However, if a clean image at the tail of the CFLRU list 470 is indiscriminately selected as a page to be replaced, memory hit rate may considerably decrease. Therefore, in the present invention, it is also considered how much the clean image located at the tail of the CFLRU list 470 is apart from the tail of the LRU list 460. Referring to FIG. 4, four pages, i.e., PAGEe (450), PAGEd (440), PAGEc (430), and PAGEb (420), are within a distance 480, in which case, the distance 480 is 4.

Accordingly, in the present embodiment, if there is a clean page within the distance 440, the clean page is selected as a page to be replaced. Otherwise, a dirty page located at the tail of the LRU list 460 is chosen as the page to be replaced.

For example, in the present embodiment, page d (440), PAGEb (420), PAGEe (450), and PAGEc (430) may be sequentially chosen as the page to be replaced, and a write operation is not performed on the flash memory 150 for PAGEd and PAGEb (420 and 410). Even though PAGEa (410) is a clean page included in the CFLRU list 470, it is not chosen as the page to be replaced because it is not within the distance 480.

In order to determine the distance 480, the number of times $N_{IN}$ that a NAND flash memory, e.g., the flash memory 150, has been read and the number of times $N_{OUT}$ that the flash memory 150 has been written are measured at intervals of a predetermined amount of time (e.g., at intervals of several seconds) or whenever a predetermined condition is met (for example, slightly after each process begins or slightly before each process is complete). Thereafter, a predetermined variable $T_{CFLRU}$ is calculated by substituting the measurement results, i.e., $N_{IN}$ and $N_{OUT}$, into Equation (1):

$$T_{CLFRU} = N_{OUT} \times T_{OUT} + N_{IN} \times T_{IN} \quad (1)$$

where $T_{OUT}$ is a constant indicating the amount of delay time regarding the reading of data from the flash memory 150, and $T_{IN}$ is a constant indicating the amount of delay time regarding the writing of data from a page cache to the flash memory 150.

The distance 480 is initially set to a value of 0 and then increases by $$\left( \text{memory size} \times \frac{1}{N} \right)$$

(where memory size indicates the number of pages included in the LRU list 460 and N is an arbitrary integer that may be determined in advance or may be dynamically determined later) at intervals of the predetermined amount of time or whenever the predetermined condition is met.

If the sum of $N_{OUT}$ and $N_{IN}$ obtained in a current iteration is larger than a threshold value and a value of $T_{CFLRU}$ obtained in the current iteration is larger than a value of $T_{CFLRU}$ obtained in a previous iteration, the distance 480 may increase or decrease by $$\left( \text{memory size} \times \frac{1}{N} \right)$$

depending on whether it has decreased or increased in the previous iteration.

In other words, if the distance 480 has decreased in the previous iteration, it increases by $$\left( \text{memory size} \times \frac{1}{N} \right)$$

in the current iteration.

However, if the distance 480 has increased in the previous iteration, it decreases by $$\left( \text{memory size} \times \frac{1}{N} \right)$$

in the current iteration.

However, if the value of $T_{CFLRU}$ obtained in the current iteration is smaller than the value of $T_{CFLRU}$ obtained in a previous iteration and the distance 480 has increased in the previous iteration, the distance 480 further increases by $$\left( \text{memory size} \times \frac{1}{N} \right).$$

On the other hand, if the value of $T_{CFLRU}$ obtained in the current iteration is smaller than the value of $T_{CFLRU}$ obtained in a previous iteration and the distance 480 has decreased in the previous iteration, the distance 480 further decreases by $$\left( \text{memory size} \times \frac{1}{N} \right).$$

For example, if memory size is 30 and N is 6, the distance 480 may increase or decrease by 5.

The cycle of measuring $N_{OUT}$ or $N_{IN}$ and the threshold value may be varied based on system load, then those can be set by a system manager.

In operation S530, one of the clean pages included in the CFLRU list 470 that has been least recently used may be chosen first as a page to be replaced. However, the present invention is not restricted to it. In other words, a clean page following the clean page that has been least recently used may be chosen first as the page to be replaced. In addition, the pages included in the CFLRU list 470 may be sequentially chosen as the page to be replaced in a random order, rather than in the order from the page at the tail of the CFLRU list 470 to the page at the head of the CFLRU list 470.

Figure 6:
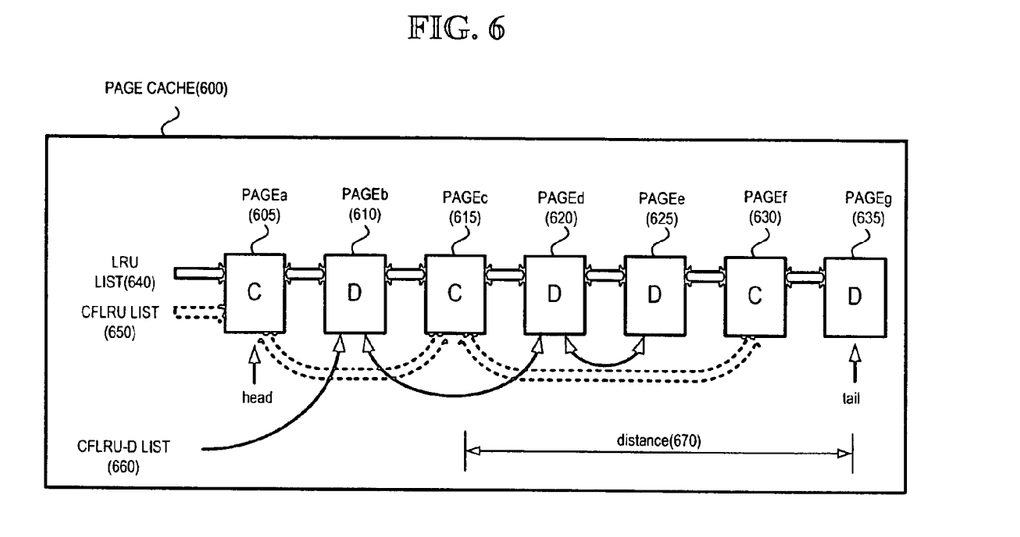
FIG. 6 is a diagram illustrating a CFLRU-dirty related (CFLRU-D) algorithm according to an exemplary embodiment of the present invention.

FIG. 6 is a diagram illustrating a CFLRU-D algorithm according to an exemplary embodiment of the present invention.

Figure 7:
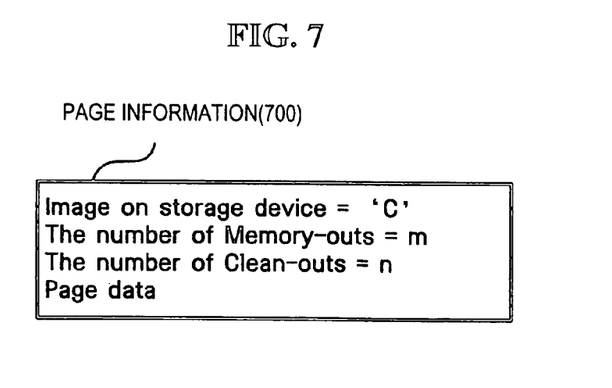
FIG. 7 is a diagram illustrating page information of a page included in a CFLRU-D list of FIG. 6.

Referring to FIG. 6, a plurality of pages of a page cache 600 managed by the CFLRU-D algorithm has page information 700 of FIG. 7.

Referring to FIGS. 1 and 7, 'Image on Storage Device' of the page information 700 specifies whether the flash memory 150 has an image of data stored in a corresponding page of the main memory 120, i.e., whether the corresponding page of the main memory 120 is a clean page or a dirty page.

If 'Image on Storage Device' is set to 'C', the corresponding page of the main memory 120 is a clean page. If 'Image on Storage Device' is set to 'D', the corresponding page of the main memory 120 is a dirty page.

'The Number of Memory-outs' indicates the number of times that the corresponding page of the main memory 120 has been chosen as a page to be replaced through the CFLRU-D algorithm. Specifically, 'The Number of Memory-outs' indicates the sum of the number of times that the corresponding page of the main memory 120 has been abandoned as a clean page and the number of times that data stored in the corresponding page of the main memory 120 has been written to the flash memory 150 as a dirty page.

'The Number of Clean-outs' indicates the number of times that the corresponding page of the main memory 120, as a clean page, has been abandoned through page replacement.

'Page Data' serves as an address or a pointer designating the data stored in the corresponding page of the main memory 120.

Referring to FIG. 6, in the CFLRU-D algorithm, the pages of the page cache 600 are managed using a LRU list 640, a CFLRU list 650, and a CFLRU-D list 660. The LRU list 640 and CFLRU list 650 are the same as their respective counterparts of FIG. 4. The CFLRU-D list 660 sequentially lists the pages of the page cache 600 so that a dirty page that has been the most recently used is listed first and a dirty page that has been least recently used is listed last. The CFLRU-D list 660 lists only some of a plurality of dirty pages included in the page cache 600 that satisfy a predetermined condition.

Specifically, a dirty page whose 'The Number of Memory-outs' is set to M or higher and whose 'The Number of Clean-outs' is set to N or higher may be listed in the CFLRU-D list 660. In other words, a page that has been replaced M or more times and has been abandoned as a clean page N or more times may be listed in the CFLRU-D list 660.

A distance 670 is the same as the distance 480 of FIG. 4. In the CFLRU-D algorithm, 'The Number of Memory-outs' and 'The Number of Clean-outs' of each of the pages in the page cache 600 may be set in advance based on an initial system workload or may be dynamically set, like the distance 670, by the memory management module 140.

Figure 8:
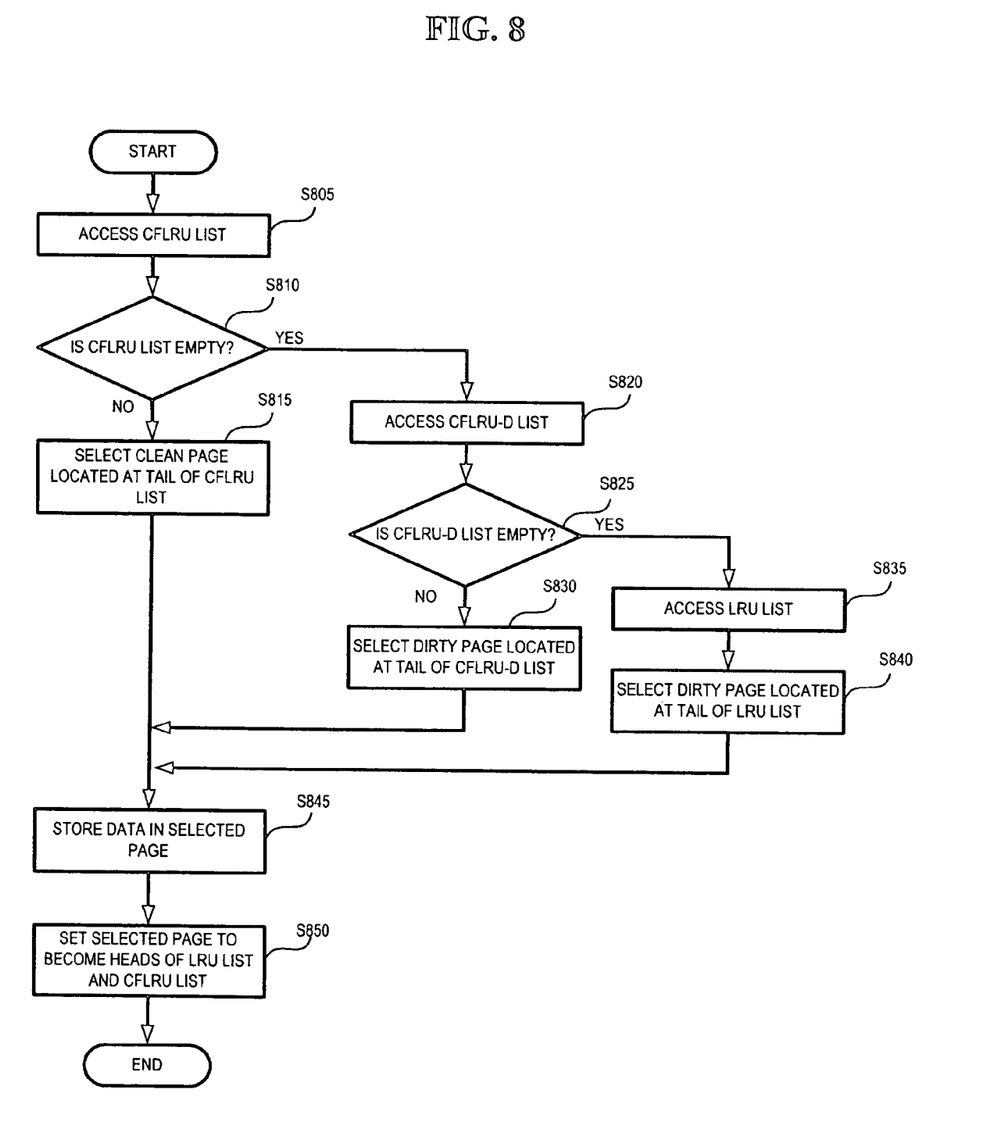
FIG. 8 is a flowchart illustrating a page replacement method using a CFLRU-D list according to an exemplary embodiment of the present invention.

FIG. 8 is a flowchart illustrating a page replacement method using a CFLRU-D list according to an exemplary embodiment of the present invention.

Referring to FIGS. 1, 6, and 8, in operation S805, the CFLRU list 650 is accessed in order to select one of a plurality of pages of the main memory 120 as a page to be replaced. The CFLRU list 650 includes three clean pages, i.e., PAGEa (605), PAGEc (615), and PAGEf (630).

In operation S815, if the CFLRU list 650 is not empty, PAGEf (630) located at the tail of the CFLRU list 650 is chosen as the page to be replaced. In operation S845, data downloaded from the flash memory 150 is stored in PAGEf (630). Since PAGEf (630) is a clean page whose image is stored in the flash memory 150, data stored in PAGEf (630) does not need to be written to the flash memory 150.

In operation S850, a pointer pointing to the heads of the LRU list 640 and the CFLRU list 650 now points to PAGEf (630). In other words, since PAGEf (630) is a page that has been most recently used and the image of PAGEf (630) is stored in the flash memory 150, PAGEf (630) is located both at the head of the LRU list 640 and at the head of the CFLRU list 650. If PAGEf (630) is modified afterwards, it is removed from the CFLRU list 650, in which case, if 'The Number of Memory-outs' and 'The Number of Cleanouts' in the page information 700 of PAGEf (630) satisfy a predetermined condition, PAGEf (630) may be included in the CFLRU-D list (660) so that it is located at the head of the CFLRU-D list (660).

In operation S820, if the CFLRU list 650 is empty, the memory management module 140 accesses the CFLRU-D list 660.

In operation S830, if the CFLRU-D list 660 is not empty, one of a plurality of dirty pages included in the CFLRU-D list 660, particularly, a dirty page located at the tail of the CFLRU-D list 660, is chosen as the page to be replaced. In operation S845, the data downloaded from the flash memory 150 is stored in the dirty page chosen in operation S830. Since the flash memory 150 does not have an image of the dirty page chosen in operation S830, data stored in the dirty page chosen in operation S830 needs to be written to the flash memory 150. In operation S850, the pointer pointing to the heads of the LRU list 640 and the CFLRU list 650 now points to the dirty page chosen in operation S830. If the data stored in the dirty page chosen in operation S830 is modified afterwards, the dirty page chosen in operation S830 is removed from the CFLRU list 650, in which case, if 'The Number of Memory-outs' and 'The Number of Clean-outs' in the page information 700 of the dirty page chosen in operation S830 satisfy the predetermined condition, the dirty page chosen in operation S830 may be included in the CFLRU-D list (660) so that it is located at the head of the CFLRU-D list (660).

In operation S835, if the CFLRU list 650 and the CFLRU-D list 660 are empty, the memory management module 140 accesses the LRU list 640. In operation S840, a dirty page located at the tail of the LRU list 640 is chosen as the page to be replaced. In operation S845, the data downloaded from the flash memory 150 is stored in the dirty page chosen in operation S840. Since the flash memory 150 does not have an image of the dirty page chosen in operation S840, data stored in the dirty page chosen in operation S840 needs to be written to the flash memory 150. In operation S850, the pointer pointing to the heads of the LRU list 640 and the CFLRU list 650 now points to the dirty page chosen in operation S840. If the data stored in the dirty page chosen in operation S840 is modified afterwards, the dirty page chosen in operation S840 is removed from the CFLRU list 650, in which case, if 'The Number of Memory-outs' and 'The Number of Clean-outs' in the page information 700 of the dirty page chosen in operation S840 satisfy the predetermined condition, the dirty page chosen in operation S840 may be included in the CFLRU-D list (660) so that it is located at the head of the CFLRU-D list (660).

For example, referring to FIG. 6, PAGEf (630), PAGEc (615), PAGEe (625), PAGEd (620), and PAGEg (635) are sequentially replaced and then transferred to the flash memory 150 through the CFLRU-D algorithm. A write operation is not performed on the flash memory 150 for PAGEf (630) and PAGEc (615). Page PAGEa (605) and PAGEb (610) are not within the distance 670 and thus are not even considered as candidates for the page to be replaced.

In operation S830, one of the dirty pages included in the CFLRU-D list 660 that has been least recently used may be chosen first as a page to be replaced. However, the present invention is not restricted to it. In other words, a dirty page following the dirty page that has been least recently used may be chosen first as the page to be replaced. In addition, the dirty pages included in the CFLRU-D list 660 may be sequentially chosen as the page to be replaced in a random order, rather than in the order from the dirty page at the tail of the CFLRU-D list 660 to the dirty page at the head of the CFLRU-D list 660.

As described above, the page replacement method according to the present invention can reduce data input or output delay and can enhance a memory hit rate by minimizing the number of write operations performed on a flash memory.

In addition, the page replacement method according to an exemplary embodiment of the present invention can reduce the power consumption of a system including a flash memory by reducing the number of read operations or write operations performed on the flash memory.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limiting, but are illustrative in all aspects.

What is claimed is:

1. A page replacement method comprising:
   (a) establishing a first page list in which a plurality of pages in a main memory are listed in an order that they have been used;
   (b) establishing a second page list in which some of the pages in the main memory whose images are stored in a storage medium are listed in an order that said some of the pages have been used; and
   (c) storing data downloaded from the storage medium in the pages included in the second page list in an order opposite to the order that the corresponding pages are listed in the second page list.

2. The page replacement method of claim 1, wherein the storage medium comprises a flash memory.

3. The page replacement method of claim 1, wherein the first page list sequentially lists the pages in the main memory so that a page that has been the most recently used is listed first and a page that has been least recently used is listed last.

4. The page replacement method of claim 1, wherein the second page list sequentially lists the pages whose images are stored in the storage medium so that a page that has been the most recently used is listed first and a page that has been least recently used is listed last.

5. The page replacement method of claim 1, further comprising (d) listing the pages in which the data downloaded from the storage medium is stored, in the second page list.

6. The page replacement method of claim 1, wherein the pages in which the data downloaded from the storage medium is stored, are within a preset distance from the tail of the second page list.

7. A page replacement method comprising:
   (a) establishing a first page list in which a plurality of pages in a main memory are listed in an order that they have been used;
   (b) establishing a second page list in which some of the pages in the main memory whose images are stored in a storage medium are listed in an order that said some of the pages have been used;
   (c) establishing a third page list in which some other of the pages in the main memory whose images are not stored in the storage medium are listed in an order that said at least one other of the pages have been used;
   (d) storing data downloaded from the storage medium in the pages included in the second page list in an order opposite to the order that the corresponding pages are listed in the second page list, if the second page list is not empty, and
   (e) storing data downloaded from the storage medium in the pages included in the third page list in an order opposite to the order that the corresponding pages are listed in the third page list, if the second page list is empty.

8. The page replacement method of claim 7, wherein the storage medium comprises a flash memory.

9. The page replacement method of claim 7, wherein the first page list sequentially lists the pages in the main memory so that a page that has been the most recently used is listed first and a page that has been least recently used is listed last.

10. The page replacement method of claim 7, wherein the second page list sequentially lists the pages whose images are stored in the storage medium so that a page that has been the most recently used is listed first and a page that has been least recently used is listed last.

11. The page replacement method of claim 7, wherein the third page list sequentially lists the pages whose images are not stored in the storage medium so that a page that has been the most recently used is listed first and a page that has been least recently used is listed last according to a predetermined condition.

12. The page replacement method of claim 7, further comprising listing the pages having data downloaded from the storage medium stored therein in the second page list.

13. The page replacement method of claim 7, wherein the pages in which the data downloaded from the storage medium is stored are within a preset distance from the tail of the second page list.

14. The page replacement method of claim 7, wherein the third page list lists the pages that are referenced from the main memory, according to the number of times greater than a preset value that the main memory is referenced.

15. The page replacement method of claim 7, wherein when the pages are referenced from the main memory, the third page list lists the pages that are not stored in the storage medium by the number of times greater than a preset value that the main memory is referenced.

16. A page replacement method comprising:
   (a) establishing a first page list in which a plurality of pages in a main memory are listed in an order that they have been used;
   (b) establishing a second page list in which some of the pages in the main memory whose images are not stored in a storage medium are listed in an order that said some of the pages have been used; and
   (c) storing data downloaded from the storage medium in the pages included in the second page list in an order opposite to the order that the corresponding pages are listed in the second page list.

17. The page replacement method of claim 16, wherein the storage medium comprises a flash memory.

18. The page replacement method of claim 16, wherein the first page list sequentially lists the pages in the main memory so that a page that has been the most recently used is listed first and a page that has been least recently used is listed last.

19. The page replacement method of claim 16, wherein the second page list sequentially lists the pages whose images are not stored in the storage medium so that a page that has been the most recently used is listed first and a page that has been least recently used is listed last according to a predetermined condition.

20. The page replacement method of claim 16, wherein the pages in which the data downloaded from the storage medium is stored are within a preset distance from the tail of the second page list.

21. The page replacement method of claim 16, wherein the second page list lists the pages that are referenced from the main memory, according to the number of times greater than a preset value that the main memory is referenced.

22. The page replacement method of claim 16, wherein when the pages are referenced from the main memory, the second page list lists the pages that are not stored in the storage medium according to the number of times greater than a preset value that the main memory is referenced.

* * * * *